July 6, 1926.

G. Q. SEAMAN

TRANSMISSION GEAR

Filed June 4, 1925  3 Sheets-Sheet 1

1,591,784

WITNESSES

INVENTOR
George Q. Seaman,
BY
ATTORNEYS

July 6, 1926.
G. Q. SEAMAN
1,591,784
TRANSMISSION GEAR
Filed June 4, 1925
3 Sheets-Sheet 2
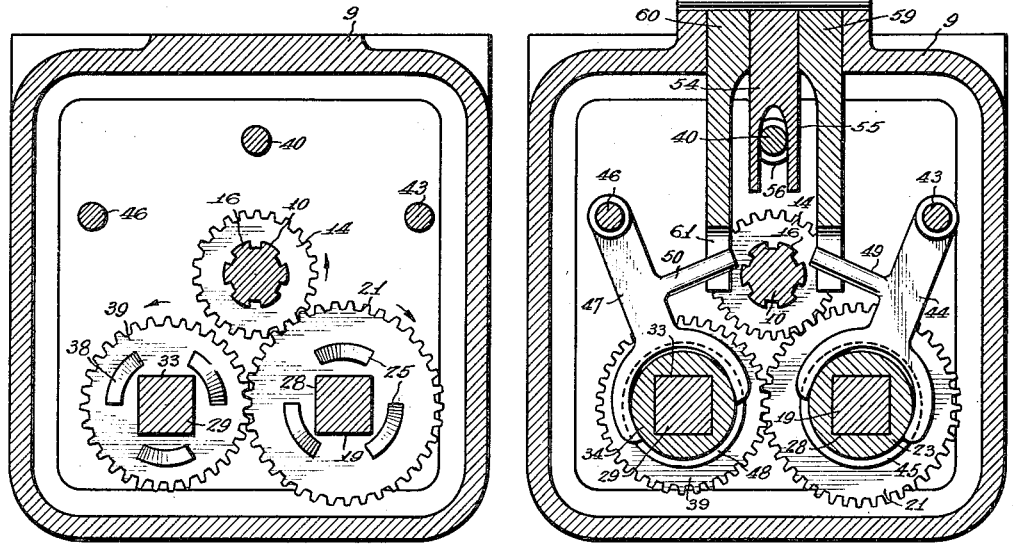
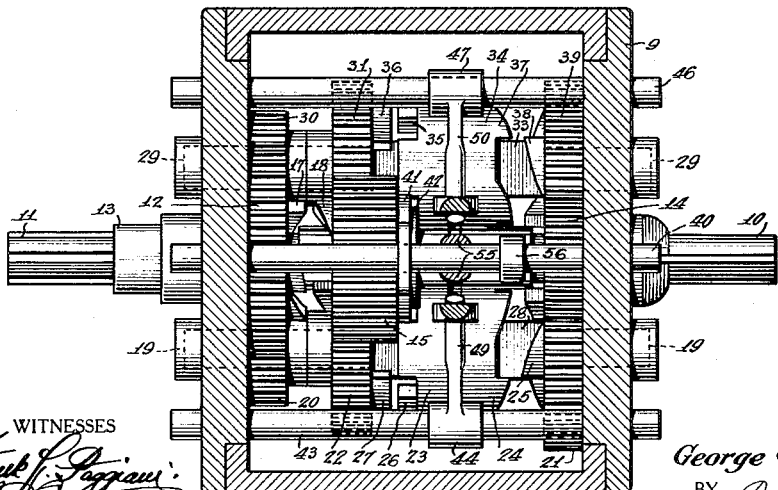
WITNESSES
INVENTOR
George Q. Seaman,
BY
ATTORNEYS July 6, 1926.  
G. Q. SEAMAN  
TRANSMISSION GEAR  
Filed June 4, 1925  
1,591,784  
3 Sheets-Sheet 3
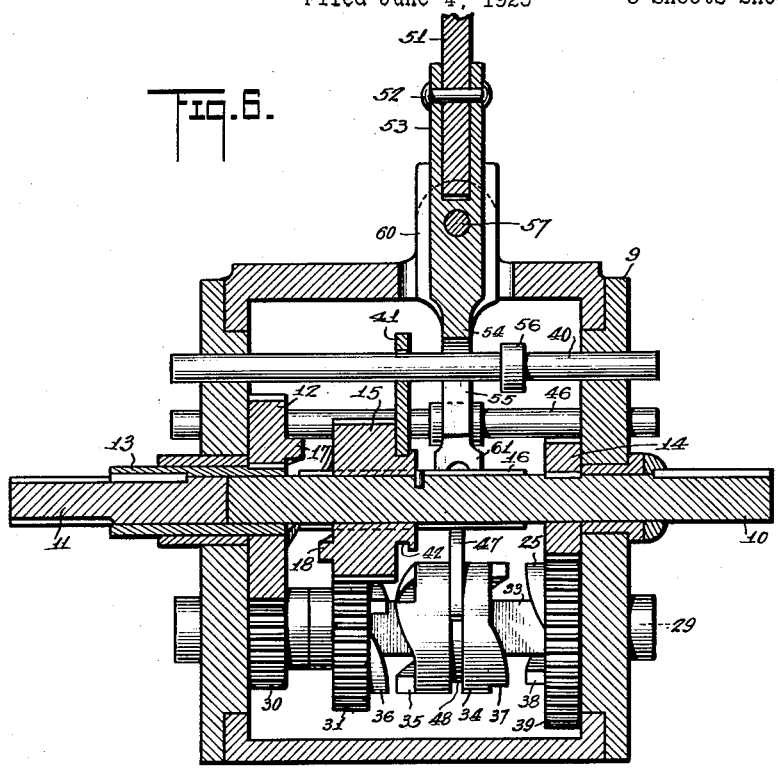
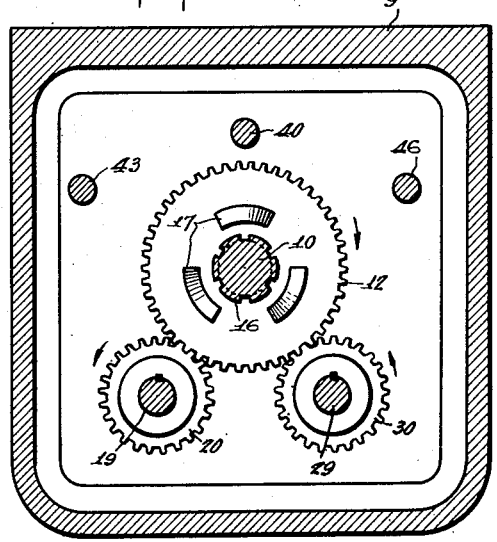
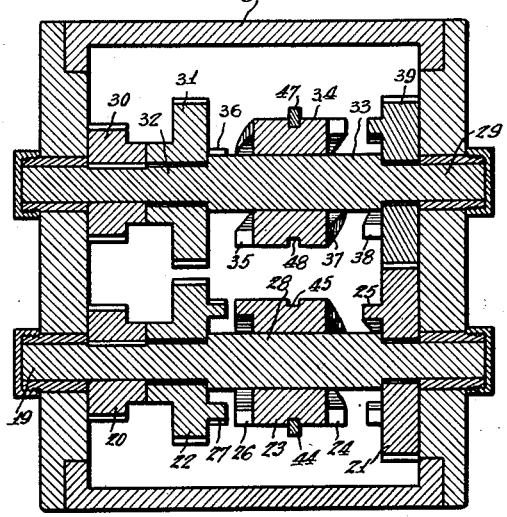
WITNESSES
INVENTOR  
*George Q. Seaman,*  
BY  
ATTORNEYS Patented July 6, 1926.

1,591,784

UNITED STATES PATENT OFFICE.

GEORGE Q. SEAMAN, OF BROOKLYN, NEW YORK.

TRANSMISSION GEAR.

Application filed June 4, 1925. Serial No. 34,931.

My invention relates to a transmission gear especially intended for use on automobiles and more particularly the invention relates to a transmission gearing having a plurality of forward speeds and reverse.

The general object of my invention is to provide a transmission gear which may be unfailingly and readily thrown into the positions to produce the different speeds.

A further object of the invention is to provide a gear comparatively simple and of few elements, yet capable of producing a plurality of forward speeds and reverse.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a view partly in elevation and partly in section showing a transmission gear embodying my invention, the section being through the casing at a side of the gearing;

Figures 2, 3 and 4 are transverse vertical sections respectively on the lines 2—2, 3—3 and 4—4, Figure 1;

Figure 5 is a horizontal section on the line 5—5, Figure 1;

Figure 6 is a longitudinal vertical section on the line 6—6, Figure 2;

Figure 7 is a transverse vertical section on the line 7—7, Figure 1;

Figure 8 is a horizontal section on the line 8—8, Figure 1.

Figure 1:
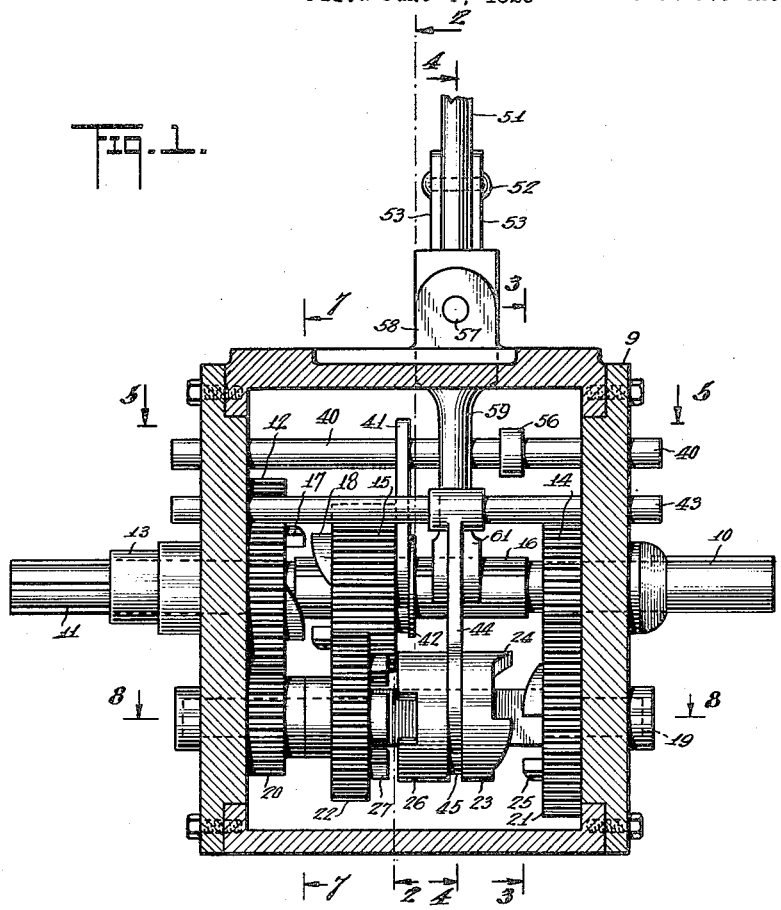
Figure 2:
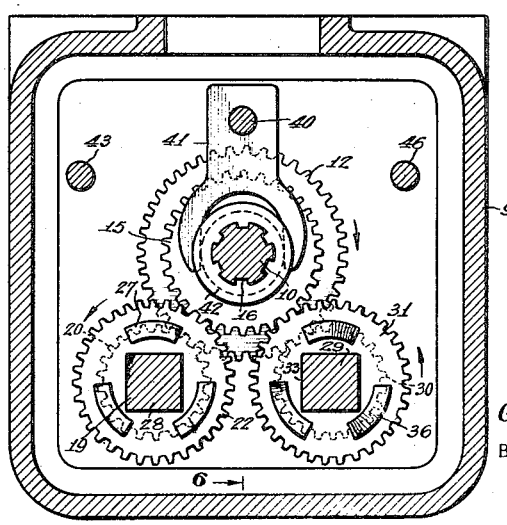

Briefly, the invention comprises a drive shaft or engine shaft; a driven shaft coaxial therewith; a first-speed or low-speed counter-shaft; and a second counter-shaft for intermediate speed and for reversing. The high speed is by direct connection between the drive or engine-shaft and the driven shaft. The low-speed shaft has gear elements thereon coacting with elements on the driven shaft and on the drive shaft to bring about a braking action by causing the engine shaft to be driven by the driven shaft, as in going down hill. When the gear is thrown into action for a higher speed from a lower speed, said lower speed is automatically thrown out of action because of the speed relation between the gear elements of the respective assemblages.

In carrying out the invention in practice, in accordance with the illustrated example, a drive shaft or engine shaft 10 is coaxial with the driven shaft 11. A gear wheel 12 is keyed to a sleeve 13 overlapping both the drive shaft 10 and driven shaft 11 and keyed to said shaft 11, thereby establishing a fixed relation between the gear wheel 12 and the driven shaft permitting a relative turning of the drive shaft 10 relatively to said gear wheel 12 and the driven shaft 11. On drive shaft 10 is also keyed a pinion 14. The pinion 12 is at one side of the gear casing 9 while the pinion 14 is on shaft 10 at the opposite side of said gear casing. There is also on drive shaft 10 a slidable pinion 15 held against turning by splines 16. On gear wheel 12 are clutch elements 17 and on sliding pinion 15 are clutch elements 18 mating said elements 17 to engage the same.

The numeral 19 indicates the first-speed or low-speed drive shaft on which is keyed a pinion 20 at one side of casing 9, said pinion 20 being in constant mesh with gear wheel 12 on driven shaft 11. On low-speed shaft 19 at the opposite side of casing 9 from the pinion 20, is a loose pinion 21 which is in constant mesh with the pinion 14 fast on the drive shaft 10.

On low-speed shaft 19 furthermore is a loose pinion 22 mounted on a round section of said shaft 19, said pinion 22 being in constant mesh with the slidable pinion 15 on drive shaft 10. Slidable on a squared section 28 of low-speed shaft 19 is a clutch 23 which at one side has clutch elements 24 mating and adapted to engage clutch elements 25 on loose pinion 21. On clutch element 23 at the opposite face from the clutch elements 24, are clutch elements 26 adapted to engage clutch elements 27 on the opposed face of the loose pinion 22 of the shaft 19.

At the opposite side of a vertical medial line passing through the drive shaft 10 and driven shaft 11 is a second counter-shaft 29 which functions for the second or intermediate drive speed. On shaft 29 is keyed a pinion 30 which in practice is the same size as the keyed pinion 20 on the shaft 19 and like the pinion 20, said pinion 30 is in constant mesh with the driven wheel 12 on driven shaft 11. On second speed shaft 29 also is a loose pinion 31 turnable on a round section 32 of said shaft 29. The pinion 31 in practice lies directly opposite and is the same size as loose pinion 22 on shaft 19 and also like pinion 22, said pinion 31 is in constant mesh with the slidable pinion 15 on drive shaft 10. On a squared section 33 of shaft 29 is a sliding clutch 34 which on one face has clutch teeth 35 engagable with clutch teeth 36 on the opposed face of loose pinion 31. On the opposite face of sliding clutch 34 are clutch teeth 37 adapted to engage mating clutch teeth 38 on a pinion 39, loose on shaft 29. Said pinion 39 is driven as hereinafter referred to from the pinion 14 keyed on drive shaft 10 and in the illustrated example, the drive of pinion 39 from pinion 14 is through the medium of the corresponding pinion 21 loose on shaft 19, it being understood that said pinion 21 is simply used for this purpose instead of other expedient for driving the pinion 39 from the fixed drive shaft pinion 14; the drive through pinion 21 is distinctly advantageous.

With the above described construction to throw the gear into first or low-speed drive, the clutch 23 is shifted to engage the clutch teeth 24 with the clutch teeth 25 of loose pinion 21 on shaft 19. As said pinion 21 is continuously rotated with the turning of drive shaft 10 and pinion 14, the shaft 19 will now be turned and with it the fixed pinion 20, which pinion being in constant mesh with gear wheel 12 drives said gear wheel and with it the driven shaft 11.

If it be desired to throw the gear into intermediate drive speed from the low speed, the low speed drive connections are permitted to remain undisturbed with the clutch 23 in clutched engagement with the pinion 21. The clutch 34 is now thrown into clutched engagement with pinion 31 by engaging the clutch teeth 35, 36. The drive will now be from the drive shaft 10 and its pinion 15, through pinion 31, clutch 34, shaft 29, pinion 30, and gear 12 to actuate driven shaft 11. Directly after the intermediate drive speed connection has been made, the lower drive speed through shaft 19 will be automatically thrown out because of the ratio of the gear assemblage at one side of the casing 9 and the gear assemblage at the opposite side. Hence, while the second speed has been brought into action as described, the pinion 21 is being constantly driven from pinion 14, at which time pinion 22 is idling but the pinion 20 on shaft 19 is being driven because of the connection between said pinion 20 and the driven gear 12. The turning of pinion 20 and 19 causes the clutch 23 to turn but owing to the ratio between the gear wheel 12 with pinion 20 and the gear wheel 14 with pinion 21, said pinion 21 will be turned slower than the clutch 23. Hence, the clutch teeth 24 on clutch 23 will cam off from the clutch teeth 25 of pinion 21 and disengage the clutch 23 from said pinion 21, thereby causing the pinion 21 as well as the pinion 20 and shaft 19 to turn idly.

With high speed direct drive established between the drive shaft or engine shaft 10 and the driven shaft 11 by throwing the pinion 15 toward gear wheel 12, thereby engaging the clutch elements 17, 18, the driven shaft 11 will be actuated at engine speed. With the direct clutching of the drive shaft 10 and driven shaft 11, the intermediate drive speed connection will be disestablished automatically because the pinion 30 will be driven by the gear wheel 12 and this will turn the shaft 29 and clutch 34 at the same speed as fixed pinion 30, but the pinion 31 will be driven at a slower speed by reason of its drive connection with the pinion 15. The differential speed thus established between the clutch 34 and the pinion 31 will automatically disengage the clutch teeth 35, 36 by causing the teeth 35 to cam off from the teeth 36.

For reverse drive, the clutch 34 is moved in a direction away from the pinion 31 and into clutched engagement with the pinion 39 the clutch teeth 37, 38 then engaging. The pinion 39, as previously described, is driven from the fixed pinion 14 on drive shaft 10 through an intermediate gearing, the element 21 functioning for the purpose in the illustrated form. The drive will now be from drive shaft 10 and pinion 14 to pinion 21, to pinion 39, to clutch 34 which turns shaft 29, and through fixed pinion 30 on said shaft to the gear wheel 12 on driven shaft 11 but the turning of said shaft 11 will be reversed by the described drive connection.

When it is desired to exert a braking action and the engine is thrown out of action the momentum of the car through the rear axle develops torque in the driven shaft 11, which now becomes a drive shaft. At this time, the clutch 23 alone is in action and is brought into clutched engagement with the wheel 22 by engaging clutch teeth 26, 27. Hence, the drive will be from shaft 11 and pinion 12 to fixed pinion 20 on shaft 19 turning said shaft and with it the clutch 23, which being in clutched engagement with pinion 22 causes said pinion to turn and pinion 22 will give turning movement to pinion 15 and drive shaft 10 and thereby turn the shaft 10 and cause the engine to have a pumping action.

In the drawings, the gearing is illustrated in the neutral position, the clutch 23 being out of clutched engagement with both the pinions 21 and 22 at opposite sides thereof, the pinion 15 being out of clutched engagement with the gear wheel 12, and the clutch 34 being out of clutched engagement with the second speed pinion 31 and the reverse pinion 39.

For shifting the clutches 23 and 34 and the pinion 15 with its clutch teeth, I provide for performing the several operations controlling the clutches with a single lever through the medium of a novel shift fork assemblage associated with said lever. A central shift rod 40 is slidable longitudinally in the sides of casing 9 and carries a fork 41 straddling a shift collar 42 rigid with loose pinion 15 on the drive shaft 10. A second shift rod 43 is slidable longitudinally in the opposite sides of casing 9 and carries a fork 44 straddling the sliding clutch 23 in an annular groove 45. A third shift rod 46 carries a fork 47 straddling the clutch 34 in an annular groove 48 thereof. The shift fork 44 has an arm 49 disposed laterally inward and similarly the shift fork 47 has an arm 50 disposed laterally inward. The shift lever 51 is fulcrumed as at 52 between the members of an upstanding fork 53 on a shift fork 54 which extends downwardly and has its forked lower end 55 straddling shift rod 40 adjacent to a collar 56 on said rod. The shift fork 54 is rockable longitudinally of the gearing on a transverse pin 57 held to upstanding lugs 58 on casing 9. The pin 57 also passes through the shanks 59 and 60 disposed at opposite sides of the central shift fork 54. The lower ends of the shanks 59, 60 are forked as at 61 to straddle respectively the arms 49 and 50 of the shift forks 44, 47. The upper ends of the shanks 59, 60 are recessed as at 62 to form with the fork members 53 a box-like structure into which the lower end of shift lever 51 extends. Thus, the lever may be rocked on its fulcrum pin 52 to dispose the lower end of the lever in a central position between the upstanding fork members 53 and out of engagement with both the shank 59 and the shank 60. Or, said lever 51 may be rocked to either of the dotted line positions indicated in Figure 4 so that the lower end of the lever engages either the shank 59 or the shank 60 having forks 61. With the lever 51 upright and its lower end disposed in a central position between the members of the fork 53, the lever may be actuated in a direction for it to rock central fork 54 about the axis of the pin 57. This will throw the fork members 55 longitudinally of the shift rod 40 to slide said rod and thereby move the shift fork 41 either in a direction to cause the clutch teeth 18 of pinion 15 to engage the clutch teeth 17 of gear wheel 12 or in a direction for said shift rod 40 to carry the shift fork 41 in a direction to unclutch the teeth 18 and 17. With the lever 51 rocked to engage its lower end in the recess 62 of shank 59 the forked end 61 of said shank 59 will engage the arm 49 of shift fork 44 for throwing the clutch 23 in either direction according to the direction in which the lever 51 and with it the shank 59 is rocked about the axis of the pin 57. Similarly, if the lever 51 be first rocked on its fulcrum 52 to engage the recess 62 of the shank 60, the forked lower end of shank 60 will act on the arm 50 of clutch fork 47 and throw the clutch 34 in one direction or the other along shaft 29 according to the direction in which the lever 51 and with it the shank 60 are rocked about the axis of the pin 57.

It will be noted that the lever 51 when engaged with shank 59 or the shank 60, is still in engagement through fulcrum pin 52 with the central fork 54 but this fact is of no moment because when the lever 51 is caused to rock either shank 59 or shank 60 about axis of pin 57, only a slight movement in a similar direction will be imparted to the shift fork 54, the movement not being sufficient to cause engagement or disengagement of the clutch teeth 18 on pinion 15 and clutch teeth 17. Moreover, any accidental movement imparted to the shift fork 54 when the shank 59 or shank 60 is rocked cannot effect engagement or disengagement of clutch teeth 17, 18. With the throwing of the clutch 23 by a movement of shank 59, the clutch teeth on either face of said clutch 23 will have a full engagement with the clutch teeth 25 or clutch teeth 27 before the movement of fork 54 a sufficient distance to engage or disengage the clutch teeth 17, 18. Similarly, if the clutch 34 be moved through the medium of shank 60 any incidental movement of the fork 54 will be of no moment because the clutch teeth 35 will have reached the limit of clutching engagement with teeth 36 before any movement of fork 54 can effect a clutching engagement of teeth 17, 18.

Reverting to the automatic disengagement of the clutch 23 from the driving wheel 21 of the first or low speed drive and the disengagement of the clutch 34 from the wheel 31, it is to be noted that in the gear assemblages during which the throwing out of one or the other clutch is brought about, the gear wheel 12 on the driven shaft 11 functions first, to drive the pinion 20, shaft 19 and clutch 23 at a higher speed than the pinion 21, and second, to drive the pinion 30, shaft 33, and clutch 34 at a higher speed than the loose pinion 31. Thus, the automatic disengagement after throwing into one speed from a lower speed is due to the relative speed produced by the gear assemblage at one side of the casing and the assemblage at the opposite side.

Reverting to the braking action when the engine is cut out and under the momentum attained by the car to which the transmission gear is applied, it is to be noted that no one of the transmission gear assemblages for the different speeds is employed to bring about the said braking action. On the other hand, it will be observed that when clutch 23 is in engagement with pinion 22 for bringing about the braking action through gear wheel 12, pinion 20, shaft 19, pinion 22, and pinion 15, to the drive shaft, the transmission pinion 21 of the low speed drive is out of action, the transmission pinion 31 for intermediate speed is out of action, and the clutch teeth 18 on pinion 15 are out of engagement with the teeth 17 and gear wheel 12. I would explain here that the clutch teeth 26, 27 are square teeth so that once the clutch 23 is in clutched engagement with the pinion 22 of the brake assemblage, the clutch cannot accidentally disengage nor automatically be thrown out. It will become necessary to positively throw the clutch 23 out of engagement with pinion 22 to throw the braking assemblage out of action.

It will be readily understood from the foregoing that with the brake assemblage operating while the several speed gear assemblages are out of action, there is no danger of automatic disengagement as would occur if the low speed drive were employed to function in producing the braking action. Moreover, the wear on the speed gears is minimized by my utilizing the same for the braking function.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A transmission gearing including a drive shaft, a driven shaft in axial alinement with the driven shaft, a pinion fast on the drive shaft, a gear wheel fast on the driven shaft, a counter shaft for low speed drive, a pinion loose on said counter shaft and meshing with the fixed pinion on the drive shaft, a pinion fast on the counter shaft and meshing with the fixed gear wheel on the driven shaft, and means to throw said loose pinion on the counter shaft in clutched engagement with said counter shaft; together with a second counter shaft, a pinion fixed on the second counter shaft and directly in mesh with the gear wheel on the driven shaft, a pinion slidable on the drive shaft, a pinion loose on the second counter shaft meshing with the slidable pinion on the drive shaft, and means to throw the loose pinion on the second counter shaft into clutched engagement with the said second counter shaft, and means to throw the slidable pinion on the drive shaft into clutched engagement with the fixed gear on the driven shaft.

2. A transmission gearing including a drive shaft, a driven shaft in axial alinement with the driven shaft, a pinion fast on the drive shaft, a gear wheel fast on the driven shaft, a counter shaft for low speed drive, a pinion loose on said counter shaft and meshing with the fixed pinion on the drive shaft, a pinion fast on the counter shaft and meshing with the fixed gear wheel on the driven shaft, and means to throw said loose pinion on the counter shaft in clutched engagement with said counter shaft; together with a second counter shaft, a pinion fixed on the second counter shaft and directly in mesh with the gear wheel on the driven shaft, a pinion slidable on the drive shaft, a pinion loose on the second counter shaft and meshing with the slidable pinion on the drive shaft, means to throw the loose pinion on the second counter shaft into clutched engagement with the said second counter shaft, and means to throw the slidable pinion on the drive shaft into clutched engagement with the fixed gear wheel on the driven shaft.

3. In a transmission gear, a drive shaft, a driven shaft, a counter shaft, means associated with the counter shaft to establish or disestablish a drive connection between the drive shaft and the driven shaft, said means including a loose gear on said counter shaft and driven from the drive shaft, a second counter shaft, a fixed pinion on the second counter shaft in driving connection with the driven shaft, and a pinion loose on the second counter shaft and in mesh with the loose pinion on the first counter shaft and serving to turn said loose pinion on the second counter shaft in a direction to reverse the drive.

4. In a transmission gearing, a drive shaft, a fixed pinion on the drive shaft, a driven shaft, a gear wheel fixed on the driven shaft, a counter shaft, a fixed pinion on the counter shaft and in mesh with the gear wheel on the driven shaft, a pinion loose on said counter shaft and in mesh with the fixed pinion on the drive shaft, a slidable pinion on the drive shaft, means to throw said slidable pinion into clutch with the gear wheel on the driven shaft, clutch means slidable on said counter shaft and adapted to engage or disengage the loose pinion on said counter shaft, a second counter shaft, a fixed pinion on said second counter shaft in mesh with the gear wheel on the driven shaft, a pinion loose on the second counter shaft and in mesh with the slidable pinion on the drive shaft, and a clutch slidable on the second counter shaft adapted to engage or disengage the pinion loose on said second counter shaft.

5. In a transmission gearing, a drive shaft, a fixed pinion on the drive shaft, a driven shaft, a gear wheel fixed on the driven shaft, a counter shaft, a fixed pinion on the counter shaft and in mesh with the gear wheel on the driven shaft, a pinion loose on said counter shaft and in mesh with the fixed pinion on the drive shaft, a slidable pinion on the drive shaft, means to throw said slidable pinion into clutch with the gear wheel on the driven shaft, a pinion loose on said counter shaft, clutch means slidable on said counter shaft and adapted to engage or disengage the loose pinion on said counter shaft, a second counter shaft, a fixed pinion on said second counter shaft in mesh with the gear wheel on the driven shaft, a pinion loose on the second counter shaft and in mesh with the slidable pinion on the drive shaft, and a clutch slidable on the second counter shaft adapted to engage or disengage the pinion loose on said second counter shaft; together with a pinion loose on the second counter shaft and in mesh with the loose pinion on the first counter shaft; and means to clutch said loose pinion on said second counter shaft to said second counter shaft.

6. In a transmission gearing, a drive shaft, a driven shaft, means to establish a low speed drive connection between said drive shaft and said driven shaft, means to establish an intermediate drive connection between said drive shaft and said driven shaft, means to establish a direct high-speed drive connection between said drive shaft and said driven shaft, said three means for establishing said three drive connections each including a slidable clutch to bring the respective drive connections into action, a single lever for operating said clutches, a central shift fork, said lever being rockable in two directions at right angles to each other and relatively to said central shift fork, and shift forks at opposite sides of said central shift fork and controlling respectively the low speed drive connection and the intermediate drive connection, said central fork controlling the high speed drive connection, said side forks having recesses for engagement by the lever when swung toward the respective side forks for optionally bringing either of said forks into action, said lever being adapted to be positioned in the plane of the central fork and disengaged from both of the side forks.

GEORGE Q. SEAMAN.